United States Patent
Su et al.

(10) Patent No.: US 9,632,558 B2
(45) Date of Patent: Apr. 25, 2017

(54) POWER SUPPLY CONTROL METHOD FOR DISPLAY DEVICE AND DISPLAY DEVICE

(71) Applicants: BOE TECHNOLOGY GROUP CO., LTD., Beijing (CN); BEIJING BOE MULTIMEDIA TECHNOLOGY CO., LTD., Beijing (CN)

(72) Inventors: Xiao Su, Beijing (CN); Laiyou Cui, Beijing (CN); Guanghui Xiao, Beijing (CN); Lifang Wan, Beijing (CN); Yunchao Feng, Beijing (CN); Shuai Yang, Beijing (CN)

(73) Assignees: BOE TECHNOLOGY GROUP CO., LTD., Beijing (CN); BEIJING BOE MULTIMEDIA TECHNOLOGY CO., LTD., Beijing (CN)

( * ) Notice: Subject to any disclaimer, the term of this patent is extended or adjusted under 35 U.S.C. 154(b) by 137 days.

(21) Appl. No.: 14/436,312

(22) PCT Filed: Nov. 19, 2014

(86) PCT No.: PCT/CN2014/091639
§ 371 (c)(1),
(2) Date: Apr. 16, 2015

(87) PCT Pub. No.: WO2015/131556
PCT Pub. Date: Sep. 11, 2015

(65) Prior Publication Data
US 2016/0274649 A1 Sep. 22, 2016

(30) Foreign Application Priority Data
Mar. 7, 2014 (CN) .......................... 2014 1 0083598

(51) Int. Cl.
*G06F 1/32* (2006.01)

(52) U.S. Cl.
CPC .............. *G06F 1/3231* (2013.01); *G06F 1/32* (2013.01); *G06F 1/3287* (2013.01)

(58) Field of Classification Search
CPC .... G06F 1/3218; G06F 1/3231; G06F 1/3265; Y02B 60/1242
See application file for complete search history.

(56) References Cited

U.S. PATENT DOCUMENTS

2010/0295782 A1 11/2010 Binder
2011/0206353 A1* 8/2011 Yeo ...................... G06F 1/3231
386/291

(Continued)

FOREIGN PATENT DOCUMENTS

CN 1603987 A 4/2005
CN 101158853 A 4/2008

(Continued)

OTHER PUBLICATIONS

English Translation of the Written Opinion of the International Searching Authority dated Feb. 11, 2015 corresponding to application No. PCT/CN2014/091639.

(Continued)

*Primary Examiner* — Dennis M Butler
(74) *Attorney, Agent, or Firm* — Nath, Goldberg & Meyer; Joshua B. Goldberg

(57) ABSTRACT

The present invention belongs to the field of display technology, in particular to a power supply control method for display device and a display device. The power supply control method for a display device comprises: acquiring images of a room where the display device is located; judging whether there is any person in the room; when determining that there is a person in the room, further recognizing an action state of the person in the room and judging whether the person in the room has a demand of watching the display device; according to a result of judging (Continued)

that there is no person in the room or that the person in the room has no demand of watching, cutting power supply of the display device off.

14 Claims, 2 Drawing Sheets

(56) References Cited

U.S. PATENT DOCUMENTS

| | | | |
|---|---|---|---|
| 2013/0055001 A1* | 2/2013 | Jeong | G06F 1/3228 |
| | | | 713/323 |
| 2013/0088429 A1* | 4/2013 | Yang | G06F 1/3231 |
| | | | 345/158 |
| 2013/0311807 A1* | 11/2013 | Woo | G06F 1/3234 |
| | | | 713/323 |
| 2015/0085060 A1* | 3/2015 | Fish | G06F 1/266 |
| | | | 348/14.03 |

FOREIGN PATENT DOCUMENTS

| | | |
|---|---|---|
| CN | 101452335 A | 6/2009 |
| CN | 101458560 A | 6/2009 |
| CN | 101625716 A | 1/2010 |
| CN | 102197643 A | 9/2011 |
| CN | 103885566 A | 6/2014 |
| JP | 11288259 A | 10/1999 |

OTHER PUBLICATIONS

International Search Report dated Nov. 19, 2014 corresponding to application No. PCT/CN2014/091639.
1st Office Action issued in Chinese application No. 201410083598.5 dated Aug. 4, 2015.

* cited by examiner

POWER SUPPLY CONTROL METHOD FOR DISPLAY DEVICE AND DISPLAY DEVICE

This is a National Phase Application filed under 35 U.S.C. 371 as a national stage of PCT/CN2014/091639, filed Nov. 19, 2014, an application claiming the benefit of Chinese Application No. 201410083598.5, filed Mar. 7, 2014, the content of each of which is hereby incorporated by reference in its entirety.

FIELD OF THE INVENTION

The present invention belongs to the field of display technology, in particular to a power supply control method for display device and a display device.

BACKGROUND OF THE INVENTION

With the improvement of people's living standards, display devices, particularly flat panel display devices, have become essential household appliances in people's lives. For hundreds of millions of families in China, assuming that each family has their display device turning on for one hour on average every day, energy consumed for watching TV programs every day is amazing. Hence, striving for energy saving, while enjoying TV programs, becomes one of important indexes to be considered in the display technology.

To achieve the purpose of energy saving, there has been proposed an energy-saving control method wherein a sensor is provided on the display device, and the power supply of the display device is cut off or the display device is switched into a standby mode when the sensor detects that there is no person in the room. However, such control method has a disadvantage that the display device may be always kept in an ON state once there is a person in the room.

It has been found by researches that, when the display device is in the ON state, people may not promptly turn the display device off for various reasons even if they have no demand of watching display contents such as TV programs. In this case, extra waste of energy is caused. For example, it is common that people do not turn the display device off even when they are chatting, reading a newspaper, checking their mobile phones, having a rest or sleeping and have no demand of watching TV programs. These situations cause not only a waste of energy, but also wear and tear in use of the display device which shortens service life of the display device.

Therefore, it is desirable to provide a power supply control method that can smartly cut the power supply off when the person in the room has no demand of watching the content displayed on the display device, and a display device.

SUMMARY OF THE INVENTION

The technical problem to be solved by the present invention is to provide a power supply control method for a display device and a display device, in view of the above disadvantages of the prior art. The power supply control method for a display device can control a power supply unit of the display device better, thereby avoiding a waste of energy, improving the utilization of power supply and reducing wear and tear in use of the display device.

The technical solutions adopted to solve the technical problems of the present invention include a power supply control method for a display device, including steps of:

acquiring images of a room where the display device is located;

judging whether there is any person in the room according to the acquired image;

further recognizing an action state of the person in the room and judging whether the person in the room has a demand of watching contents displayed on the display device or not, when it is judged that there is a person in the room; and cutting off power supply of the display device according to a result of judging that there is no person in the room or a result of judging that the person in the room has no demand of watching.

Preferably, acquisition ranges for acquiring the images of the room are throughout the whole space of the room.

Preferably, an acquisition frequency for acquiring the images of the room is set as one frame per second.

Preferably, the step of judging whether there is any person in the room according to the acquired image includes: extracting features of the images of the room, comparing the extracted image features with preset facial feature information, and determining that there is a person in the room when the image features are matched with the facial feature information, or otherwise determining that there is no person in the room.

Preferably, the step of recognizing the action state of the person in the room includes: extracting action state features of the person in the room, comparing the extracted action state features with preset action state feature information, and determining the action state of the person in the room when the extracted action state features are matched with the preset action state feature information.

Preferably, the step of judging whether the person in the room has a demand of watching the contents displayed on the display device or not includes: determining that the person in the room has no demand of watching, if the action state of the person in the room is determined as sleeping, reading or chatting, and this action state lasts for five minutes or more.

The present invention further provides a display device including a power supply unit, and the display device further includes:

an image acquisition unit, configured to acquire images of a room where the display device is located;

an image recognition unit, configured to judge whether there is any person in the room according to the images acquired by the image acquisition unit, and further recognize an action state of the person in the room when it is judged that there is a person in the room;

a judgment unit, configured to judge whether the person in the room has a demand of watching the display device or not according to a duration of the action state of the person in the room recognized by the image recognition unit; and a control unit, configured to control cutoff of the power supply unit according to results of judgment from both the image recognition unit and the judgment unit.

Preferably, the image acquisition unit is at least one of a facial image acquisition sensor, a human eye pupil distance acquisition sensor and a camera, and an acquisition point of the image acquisition unit is set in the same plane with and adjacent to the display surface of the display device.

Preferably, the image acquisition unit is a 180° wide-angle image acquisition unit; or, more than one image acquisition unit are included so that acquisition ranges of the image acquisition units are throughout the whole space of the room.

Preferably, an acquisition frequency of the image acquisition unit for acquiring the images of the room is one frame per second.

Preferably, facial feature information is preset in the image recognition unit; and the image recognition unit extracts features of the images of the room, compares the extracted image features with the preset facial feature information, and determines that there is a person in the room when the image features are matched with the facial feature information, or otherwise determines that there is no person in the room.

Further, action state feature information is preset in the image recognition unit; and the image recognition unit extracts action state features of the person in the room, compares the extracted action state features with the preset action state feature information, and determines the action state of the person in the room when the action state features are matched with the preset action state feature information.

Preferably, a judgment time is preset as five minutes in the judgment unit; and if the action state of the person in the room is determined by the image recognition unit as sleeping, reading or chatting, and a duration of the action state is greater than or equal to the judgment time, the judgment unit determines that the person in the room has no demand of watching.

Preferably, the image acquisition unit, the image recognition unit, the judgment unit and the control unit share the power supply unit for power supplying.

The present invention has the following beneficial effects: according to the power supply control method for a display device and the display device provided by the present invention, by integrating image acquisition, image recognition and power supply control of the display device together, the action state of the person in the room can be analyzed automatically to judge whether there is a real demand of watching the content displayed on the display device, so that the power supply unit can be smartly turned off in a case that there is no person in the room or the person in the room does not watch the content displayed on the display device. This can greatly reduce the consumption of electric power, achieve the purpose of better energy saving and reduce wear and tear in use of the display device. Thus, energy saving and reduction of loss cost are realized.

REFERENCE NUMERALS IN THE DRAWINGS

Figure 1:
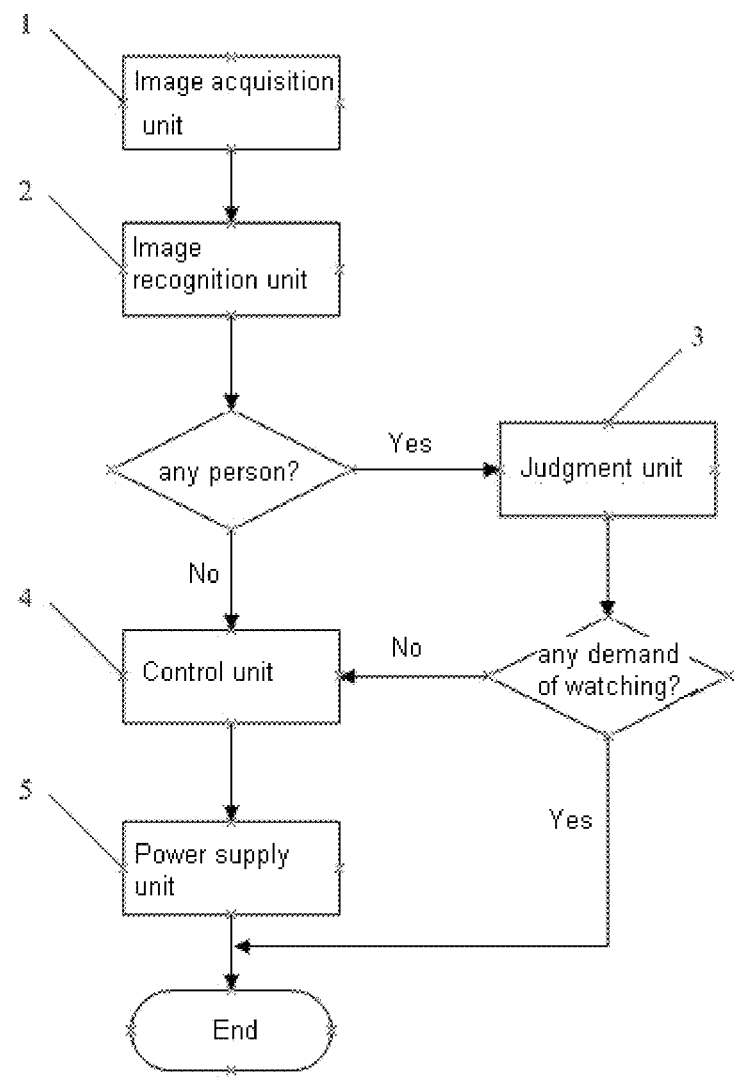
FIG. 1 is a schematic flowchart of a power supply control method for a display device provided by an embodiment of the present invention.

1: Image acquisition unit
2: Image recognition unit
3: Judgment unit
4: Control unit
5: Power supply unit

DETAILED DESCRIPTION OF THE EMBODIMENTS

To make those skilled in the art understand the technical solutions of the present invention better, a power supply control method for a display device and a display device of the present invention will be further described in detail as below with reference to the accompanying drawings and specific implementations.

The technical concepts of the present invention are as follows: as for the case where a user has no demand of watching the content displayed on the display device but the display device is still in the ON state, the following two situations are generally included: first, there is no person in the room; and second, there is a person in the room, but the person is too busy in other things to watch the display contents such as TV programs for a long time. For the first situation, it is possible to easily detect that there is no person in the room by a sensor, and the power supply of the display device is thus cut off or the display device is switched into the standby mode. For the second situation, image information about the person in the room may be acquired by an image acquisition and recognition device, and current action state of the person in the room is further recognized according to the image information acquired at each moment. For example, there are cases where people are chatting, reading, having a rest or the like, and in these cases, not only does the person in the room have no demand of watching the display device, but also the On state of the display device may have adverse effect on the action state of the person in the room. Thus, in these cases, the power supply of the display device should be cut off or the display device should be switched into the standby mode.

This embodiment provides a power supply control method for a display device, including the following steps.

At step S1, images of a room, where the display device is located, are acquired.

In this step, the images of the room, where the display device is located, may be acquired by an image acquisition unit. Preferably, acquisition range for acquiring the images of the room is throughout the whole space of the room, so that the images of the whole room, including all the persons in this room, can be acquired thoroughly and then analyzed one by one.

Further preferably, acquisition frequency for acquiring the images of the room is set to be one frame per second. Such acquisition frequency achieves a balance between realizing image recognition function and saving a bandwidth of transmission channel of the image information.

At step S2, it is judged whether there is any person in the room according to the acquired images.

In this step, an image recognition unit may be used to judge whether there is any person in the room. The method for judging whether there is any person in the room may include: extracting features of the images of the room, comparing the extracted image features with preset facial feature information, and determining that there is a person in the room when the image features are matched with the facial feature information, or otherwise determining that there is no person in the room.

At step S3, when it is judged that there is a person in the room, the action state of the person in the room is further recognized according to the image of the person in the room.

In this step, the method for recognizing the action state of the person in the room may include: extracting action state features of the person in the room, comparing the extracted action state features with preset action state feature information, and determining that the action state of the person in the room is an action state corresponding to the preset action state feature information when the extracted action state features are matched with the preset action state feature information. The action state of the person in the room may be watching TV programs, reading, chatting, sleeping or the like.

At step S4, it is judged whether the person in the room has a demand of watching the content displayed on the display device.

In this step, the method for judging whether the person in the room has a demand of watching the content displayed on the display device may include: judging that the person in the room has no demand of watching, if the action state of the person in the room is determined as sleeping, for example, in the case that a posture of the person is kept unchanged for five minutes or more, or, determined as reading, for example, in the case that the person in the room keeps his/her eyes fixed in a direction beyond the image acquisition unit for five minutes or more, or, determined as chatting, for example, in the case that more than one person keeps their eyes fixed on each other or fixed in a direction beyond the image acquisition unit for five minutes or more. In contrast, when there is at least one person in the room who keeps his/her eyes fixed in the direction of the image acquisition unit (i.e., the direction of the display screen) and his/her action state is not any one of chatting, reading and sleeping, it indicates that at least someone is watching TV programs and the like in the room and there is a demand of watching the content displayed on the display device.

Preferably, setting the judgment time to be five minutes can not only ensure that in-time judgment is made to cut the power supply of the display device off or switch the display device into the standby mode when there is no demand of watching, but also avoid turning the display device off when the person is doing other things for a short time to cause inconvenience. Of course, the judgment time may be flexibly set according to the service objects of the display device or the space where the display device is located, and is not particularly limited herein.

At step S5, according to a result of judging that there is no person in the room or a result of judging that the person in the room has no demand of watching, the power supply of the display device is cut off.

As is seen from above, in this embodiment, to further ensure effective utilization of energy, for example, when the person in the room is having a rest or sleeping, reading a book or newspaper for a long time, or keeping chatting, that is, the person in the room has no demand of watching the display contents such as TV programs, as it is considered that the display device does not exert its true use value even in the On state in these situations where not only a waste of energy is caused, but also an adverse effect is brought by influencing the rest or sleeping and reducing the efficiency of reading or learning, these situations are regarded as those in which the power supply unit of the display device should be turned off or the display device should be switched into the standby mode, so that the energy can be utilized more effectively and the utilization of energy can be improved.

As shown in FIG. 1, the power supply control method for a display device in this embodiment has the following specific procedures:

the image acquisition unit 1 is responsible for acquiring of images of a room, and transmitting the acquired image data information to the image recognition unit 2;

the image recognition unit 2 extracts features of the images of the room from the image data information acquired by the image acquisition unit 1, and recognizes whether there is any person in the room according to the image feature information;

if there is no person in the room, the image recognition unit 2 sends an instruction indicating that there is no person in the room to the control unit 4, and then the control unit 4 turns the power supply unit 5 off or switches the display device into the standby mode according to this instruction;

if there is a person in the room, the image recognition unit 2 further extracts action state features of the person in the room, and compares the extracted action state features with the preset action state feature information to determine the action state of the person in the room, and sends the action state to the judgment unit 3;

the judgment unit 3 judges whether the person in the room has a demand of watching the content displayed on the display device or not according to a duration of the action state of the person in the room, and sends a control instruction indicating that there is no demand of watching to the control unit 4 when judging that there is no demand of watching; and the control unit 4 cuts off the power supply unit 5 of the display device according to the received control instruction.

Figure 2:
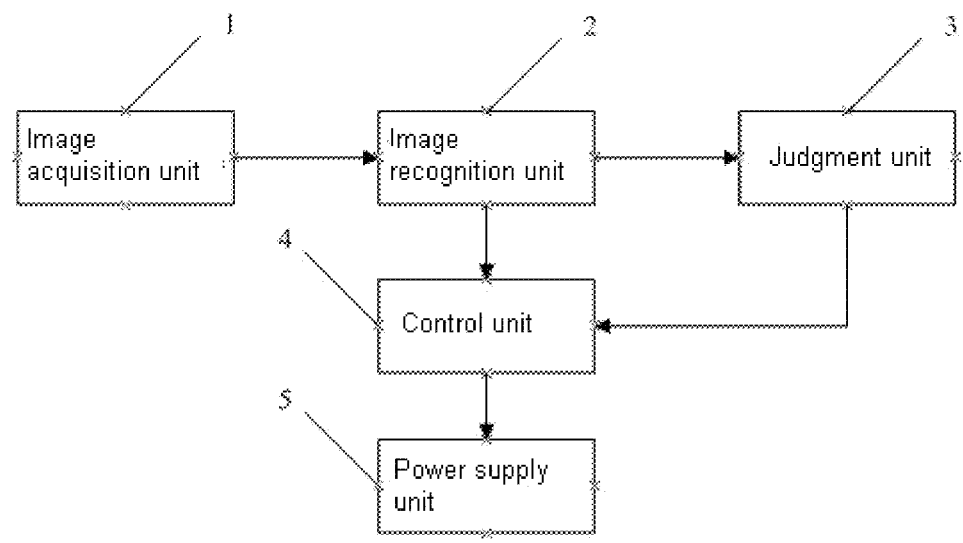
FIG. 2 is a schematic diagram of a structure of a display device provided by an embodiment of the present invention.

Correspondingly, this embodiment further provides a display device. As shown in FIG. 2, the display device includes a power supply unit 5 and further includes a control unit 4, an image acquisition unit 1, an image recognition unit 2 and a judgment unit 3, wherein, the image acquisition unit 1 is electrically connected to the image recognition unit 2, and used for acquiring images of a room where the display device is located; the image recognition unit 2 is electrically connected to the judgment unit 3 and the control unit 4 respectively, and used for judging whether there is any person in the room according to the images acquired by the image acquisition unit 1, and further recognizing an action state of the person in the room when judging that there is a person in the room; the judgment unit 3 is further electrically connected to the control unit 4, and used for judging whether the person in the room has a demand of watching the content displayed on the display device or not according to a duration of the action state of the person in the room recognized by the image recognition unit 2; the control unit 4 is electrically connected to the power supply unit 5, and used for controlling the cutoff of the power supply unit 5 according to results of judgment from the image recognition unit 2 and the judgment unit 3.

Here, the image acquisition unit 1 is responsible for acquiring image information of the room. The image acquisition unit 1 may be at least one of a facial image acquisition sensor, a human eye pupil distance acquisition sensor and a camera, and an acquisition point of the image acquisition unit 1 and a display surface of the display device are set in the same plane and adjacent to each other, so that image display on the display screen of the display device faces the same direction as the acquisition point of the image acquisition unit 1, that is, when a person is watching a TV program or the like, his/her eyes can be focused on both the display screen and the image acquisition unit 1 to ensure effectiveness of image acquisition and judgment.

Preferably, the acquisition ranges of the image acquisition unit 1 are throughout the whole space of the room. The image acquisition unit 1 may be a 180° wide-angle mode image acquisition unit; or, more than one image acquisition unit is included. Preferably, more than three image acquisition units can acquire image information of the whole room within a 180° wide-angle range which takes the display device as the center. Here, further preferably, the acquisition frequency of the image acquisition unit 1 for acquiring the images of the room is one frame per second. Such acquisition frequency achieves a balance between realizing image recognition function and saving a bandwidth of transmission channel of the image information.

The image recognition unit 2 receives the image information acquired by the image acquisition unit 1, judges whether there is any person in the room and recognizes the action state of the person in the room. In a case that the image acquisition unit 1 is a facial image acquisition sensor, facial feature information may be preset in the image recognition unit 2; and the image recognition unit 2 extracts features of the images of the room, compares the extracted image features with the preset facial feature information, and determines that there is a person in the room when the image features are matched with the facial feature information, or otherwise determines that there is no person in the room. Of course, when it is determined that there is a person in the room, the number of persons in the room may be further recognized.

It should be understood here that, face recognition technology, as a currently hot image recognition method, has involved a lot of effective and mature algorithms at present, and the face recognition in the power supply control method for a display device as described in this embodiment may directly refer to appropriate mature algorithms, and will not be described in detail here. The use of the currently mature face recognition technology may allow the display device to accurately determine the number of persons in the room, thus improving the reliability of the recognition results of the device.

The image acquisition unit 1 may be a human eye pupil distance acquisition sensor which is a sensor for acquiring the pupil distance of human eyes. The pupil distance is a straight-line distance between the pupil of a left eye and the pupil of a right eye, and generally, a horizontal distance between geometric centers of the pupils of the two eyes is defined as the pupil distance. When the human eyes are fixed in different directions, due to aggregation, positions of the pupils may change, and the pupil distance changes correspondingly. In this embodiment, by measuring the pupil distance of the two eyes of the person in the room and judging the range of the pupil distance of the eyes of the person in the room, an object that the person looks at is deduced.

As there is certain difficulty in accurately determining positions of the geometric centers of the pupils during the actual measurement, visual line detection technology may be employed in this embodiment, where the visual line distance (i.e., a distance between the visual lines of the two eyes), instead of the pupil distance, is measured. In this case, the image acquisition unit 1 may be a camera, and the visual line detection technology utilizes the camera to acquire the visual line distance of the person in the room and utilizes the image recognition unit 2 to recognize whether the eyes of the person in the room are focused on the display screen. In practical applications, if the image recognition unit 2 determines that the eyes of the person in the room are focused on the display screen, a signal identifier will be generated; in contrast, if the image recognition unit 2 determines that the person in the room takes his/her eyes off the display screen, another signal identifier will be generated. The use of the human eye pupil distance acquisition sensor may allow the display device to accurately determine the line-of-sight direction of the person in the room, thus improving the reliability of the recognition results of the device.

Further, action state feature information is also preset in the image recognition unit 2; and the image recognition unit 2 extracts action state features of the person in the room, compares the extracted action state features with the preset action state feature information, and determines that the action state of the person in the room is an action state corresponding to the preset action state feature information when the action state features are matched with the preset action state feature information.

The judgment unit 3 is responsible for analyzing the action state of the person in the room, transmitted from the image recognition unit 2, and judging whether the person in the room has a demand of watching the display contents such as TV programs displayed on the display device or not according to the duration of the action state of the person in the room. The judgment time may be preset in the judgment unit 3, and preferably, is five minutes. When the image recognition unit 2 determines the action state of the person in the room as sleeping, reading or chatting, the judgment unit 3 determines whether the duration of the action state is greater than or equal to five minutes or not, and if so, the judgment unit 3 determines that the person in the room has no demand of watching the content displayed on the display device.

By setting the judgment time to be five minutes, it can be ensured that in-time judgment is made to cut the power supply of the display device off or switch the display device into the standby mode when there is no demand of watching, and inconvenience caused by turning the display device off when the person is doing other things for a short time may also be avoided.

The control unit 4 receives results of judgment transmitted from the image recognition unit 2 and the judgment unit 3, and controls the cutoff of the power supply unit 5 according to the results of judgment. For example, when the result of judgment from the image recognition unit 2 shows that there is no person in the room, or, when the result of judgment from the judgment unit 3 shows that the person in the room has no demand of watching the content displayed on the display device, the control unit 4 cuts the power supply of the display device off or switches the display device into the standby mode.

Preferably, the image acquisition unit 1, the image recognition unit 2, the judgment unit 3 and the control unit 4 share the power supply unit 5 for power supply. That is, the power supply unit 5 supplies the above units with electric energy required for startup or standby. If the power supply of the display device is turned off, all the above units are in an OFF state and unable to operate. That is, all the above units can operate only when the display device is in the ON state. In this way, the real energy saving control is realized.

In this embodiment, the display device may be any product or component having a display function, such as an LCD panel, electronic paper, an OLED panel, a mobile phone, a tablet computer, a display device, a display, a notebook computer, a digital photo frame, a navigator or the like.

According to the power supply control method for a display device and the display device provided by the present invention, by integrating image acquisition and image recognition technology with power supply control of the display device, whether there is any person in the room and the action state of the person in the room can be analyzed automatically to judge whether the person in the room has a real demand of watching the display content displayed on the display device, so that the power supply unit can be smartly turned off in a case that there is no person in the room or the person in the room does not watch the display content. This can greatly reduce the consumption of electric power of the display device, achieve the purpose of better energy saving, and reduce wear and tear in use of the display device. Thus, energy saving and reduction of loss cost are realized.

It may be understood that, the foregoing implementations are merely exemplary implementations employed for illustration of the principle of the present invention, but the present invention is not limited thereto. For a person of ordinary skill in the art, various variations and improvements may be made without departing from the spirit and essence of the present invention, and these variations and improvements shall be regarded as falling into the protection scope of the present invention.

The invention claimed is:

1. A power supply control method for a display device, wherein the method comprises:
   acquiring images of a room where the display device is located;
   judging whether there is any person in the room according to the acquired image;
   further recognizing an action state of the person in the room and judging whether the person in the room has a demand of watching contents displayed on the display device or not, when it is judged that there is a person in the room; and
   cutting off power supply of the display device according to a result of judging that there is no person in the room or a result of judging that the person in the room has no demand of watching;
   wherein the recognizing the action state of the person in the room comprises: extracting action state features of the person in the room, comparing the extracted action state features with preset action state feature information, and determining the action state of the person in the room when the extracted action state features are matched with the preset action state feature information; and
   wherein the judging whether the person in the room has a demand of watching the contents displayed on the display device or not comprises: determining that the person in the room has no demand of watching, if the action state of the person in the room is determined as sleeping, reading or chatting, and this action state lasts for five minutes or more.

2. The method according to claim 1, wherein, acquisition ranges for acquiring the images of the room are throughout the whole space of the room.

3. The method according to claim 1, wherein, an acquisition frequency for acquiring the images of the room is set as one frame per second.

4. The method according to claim 1, wherein, the judging whether there is any person in the room according to the acquired image comprises: extracting features of the images of the room, comparing the extracted image features with preset facial feature information, and determining that there is a person in the room when the image features are matched with the facial feature information, or otherwise determining that there is no person in the room.

5. A display device comprising a power supply unit, wherein, the display device further comprises:
   an image acquisition unit, configured to acquire images of a room where the display device is located;
   an image recognition unit, configured to judge whether there is any person in the room according to the images acquired by the image acquisition unit, and further recognize an action state of the person in the room when it is judged that there is a person in the room;
   a judgment unit, configured to judge whether the person in the room has a demand of watching the display device or not according to a duration of the action state of the person in the room, recognized by the image recognition unit; and
   a control unit, configured to control cutoff of the power supply unit according to results of judgment from both the image recognition unit and the judgment unit;
   wherein action state feature information is preset in the image recognition unit; and the image recognition unit extracts action state features of the person in the room, compares the extracted action state features with the preset action state feature information, and determines the action state of the person in the room when the action state features are matched with the preset action state feature information; and
   wherein a judgment time is preset as five minutes in the judgment unit and if the action state of the person in the room is determined by the image recognition unit as sleeping, reading or chatting, and a duration of the action state is greater than or equal to the judgment time, the judgment unit determines that the person in the room has no demand of watching.

6. The display device according to claim 5, wherein, the image acquisition unit is at least one of a facial image acquisition sensor, a human eye pupil distance acquisition sensor and a camera, and an acquisition point of the image acquisition unit is set in the same plane with and adjacent to the display surface of the display device.

7. The display device according to claim 6, wherein, the image acquisition unit is a 180° wide-angle image acquisition unit; or, more than one image acquisition unit are comprised so that acquisition ranges of the image acquisition units are throughout the whole space of the room.

8. The display device according to claim 6, wherein, the image acquisition unit, the image recognition unit, the judgment unit and the control unit share the power supply unit for power supplying.

9. The display device according to claim 7, wherein, the image acquisition unit, the image recognition unit, the judgment unit and the control unit share the power supply unit for power supplying.

10. The display device according to claim 5, wherein, an acquisition frequency of the image acquisition unit for acquiring the images of the room is one frame per second.

11. The display device according to claim 10, wherein, the image acquisition unit, the image recognition unit, the judgment unit and the control unit share the power supply unit for power supplying.

12. The display device according to claim 5, wherein, facial feature information is preset in the image recognition unit; and the image recognition unit extracts features of the images of the room, compares the extracted image features with the preset facial feature information, and determines that there is a person in the room when the image features are matched with the facial feature information, or otherwise determines that there is no person in the room.

13. The display device according to claim 12, wherein, the image acquisition unit, the image recognition unit, the judgment unit and the control unit share the power supply unit for power supplying.

14. The display device according to claim 5, wherein, the image acquisition unit, the image recognition unit, the judgment unit and the control unit share the power supply unit for power supplying.

* * * * *